A. C. SCHNAKE.
GRASS CATCHER FOR LAWN MOWERS.
APPLICATION FILED MAY 29, 1916.
1,283,325.
Patented Oct. 29, 1918.
2 SHEETS—SHEET 2.
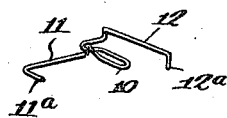
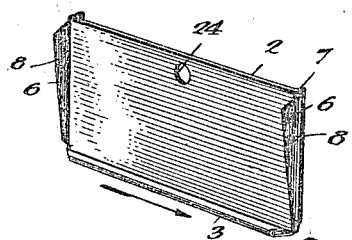
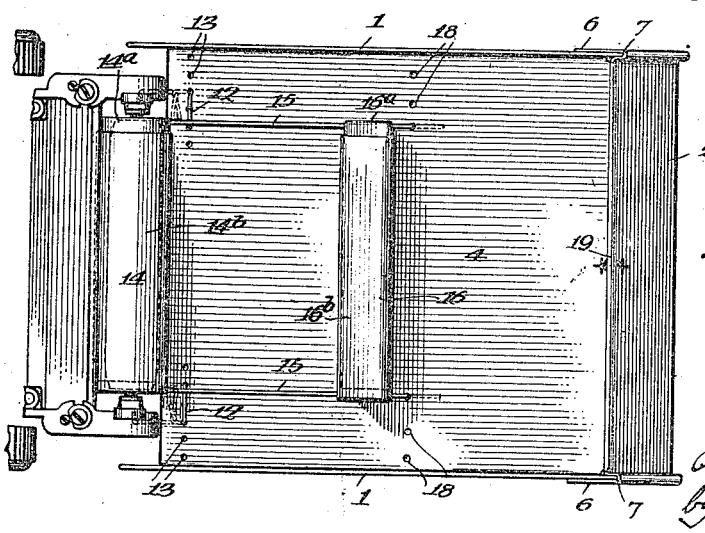
Inventor:
August C. Schnake
by
Attorney

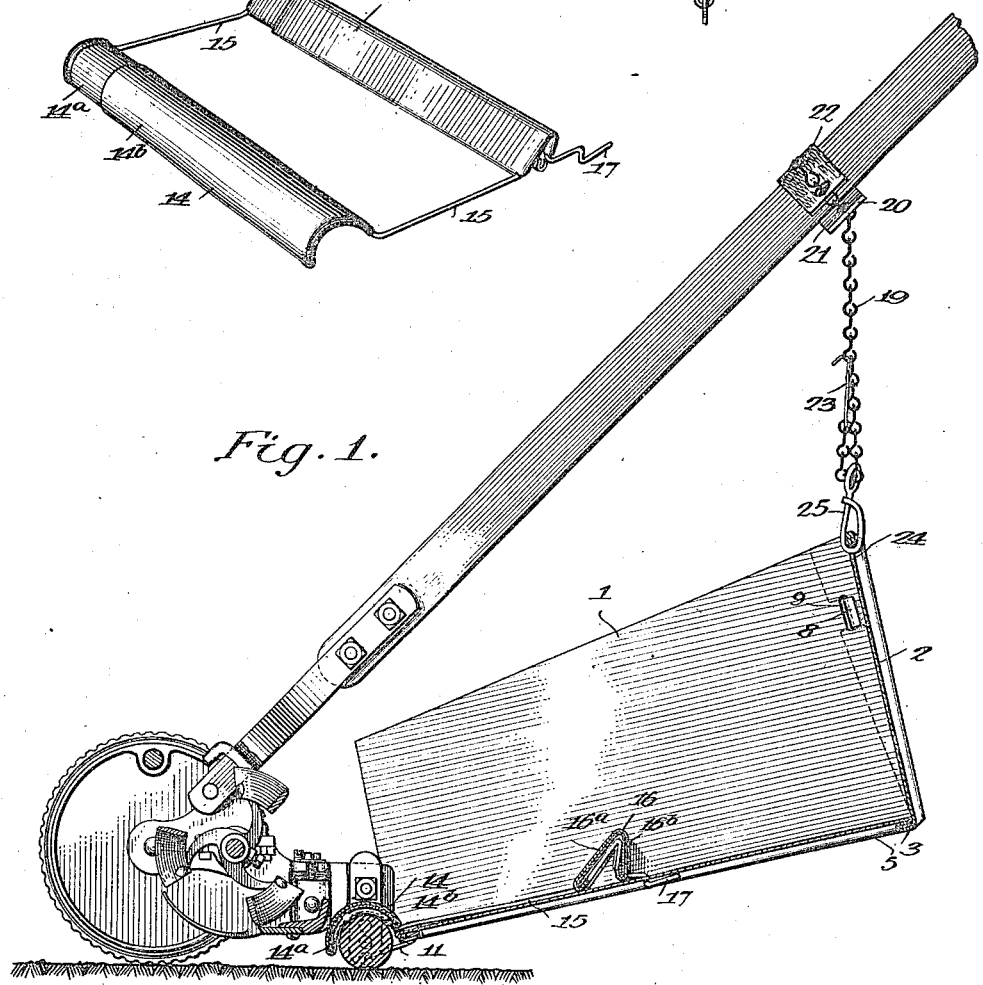

UNITED STATES PATENT OFFICE.

AUGUST C. SCHNAKE, OF CENTRALIA, ILLINOIS.

GRASS-CATCHER FOR LAWN-MOWERS.

1,283,325.           Specification of Letters Patent.     Patented Oct. 29, 1918.

Application filed May 29, 1916. Serial No. 100,523.

*To all whom it may concern:*

Be it known that I, AUGUST C. SCHNAKE, a citizen of the United States, residing at Centralia, in the county of Clinton and State of Illinois, have invented certain new and useful Improvements in Grass-Catchers for Lawn-Mowers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to grass catchers for lawn mowers, and comprises a knockdown receptacle for receiving the mowed grass having means for retaining the mowed grass within the receptacle, means adapting the grass receptacle to be attached to ordinary lawn mowers of different sizes or widths and means to support the receptacle in its proper position.

One object is to provide a device that may be knocked down to occupy the least compass of space for storage or shipment.

A further object is to produce a device that may be adjusted to be applied to ordinary lawn mowers of different sizes or widths.

A further object is to provide means to prevent the mowed grass being jarred or jolted out of the grass receptacle as the mower passes over rough ground or comes in contact with obstacles.

A further object is to provide means to permit the device to be supported in a proper position with respect to the handle bar of the mower.

And a further object is to produce a device that will be simple and efficient and may readily be attached to or removed from the lawn mower.

To attain the foregoing objects and such others as may hereinafter appear, the invention consists in the features hereinafter described and then sought to be clearly defined by the claims, reference being had to the accompanying drawings forming a part hereof and in which Figure 1 is a vertical sectional view showing the device attached to a lawn mower of ordinary construction;

Fig. 2 is a plan view showing the device attached to a mower with the handle bar and supporting means and other parts omitted;

Fig. 3 is a perspective of the grass receptacle sections detached and in position to be assembled;

Fig. 4 is a perspective of the roller guard and grass bar;

Fig. 5 is an enlarged perspective in detail showing the manner of attaching the grass receptacle to the mower;

Fig. 6 is a perspective of a member for attachment of the receptacle or pan to the lawn mower, and Fig. 7 is a cross section of the handle-bar clasp of the supporting member as shown in Fig. 1.

The grass receptacle or pan comprises side sections or members 1 and an end section or member 2 which have their bottom edges bent inwardly and then overlapped to form folded grooved flanges 3 and a bottom section 4 which has its rear and side edges turned to provide folded flanges 5 which form grooves to receive or interlock with the flanges 3 to provide a slidable and detachable interlocking engagement when the sections are assembled. The end section 2 is also provided with forwardly projecting flanges or extensions 6 formed preferably by bending its ends backwardly and then forwardly to provide grooves or seats 7 which receive the rear ends of the side members and prevent any lateral movement of the same. The extensions 6 have tongues 8 formed preferably therewith by cutting or slitting the metal and which pass through openings 9 formed in the side sections to lock the sections together. To assemble the sections, the ends of the flanges 3 are engaged with the flanges 5 and then slid into position as indicated in Fig. 3, the end section being first attached to permit the rear ends of the side sections to engage the grooves or seats 7.

The tongues 8 after being passed through the openings 9 are bent back to lock the sections in their assembled position.

Attaching members or connectors fashioned preferably from a single piece of spring wire are formed with a finger grip or loop 10 a member 11 with an inturned or bent end 11ª and an offset member 12 with a downwardly turned or bent end 12ª as shown in Fig. 6. To permit the grass receptacle or pan to be attached to mowers of different widths the bottom section of the mower has a series of perforations 13 through which the offset members 12 of the connectors will pass and be held by spring pressure or tension due to the engagement of the finger grips 10 with the underside of the bottom of the receptacle. The members 11, which are bent to incline toward each other as shown in Fig. 3 are then sprung into perforations or slots usually provided in the ordinary lawn mower for the vertical adjustment of the roller. The engagement of the bent ends 12$^a$ with their corresponding perforations, will prevent the accidental unfastening of the ends 11$^a$ of the members 11 from the mower.

The cut grass is retained within the receptacle by means of a roller guard 14 formed preferably of telescoping or slidably connected curved or arched sections 14$^a$ and 14$^b$ adapted to be supported in spaced relation with the roller, and connected by rods 15 to a grass bar 16 preferably V-shaped and also formed of telescoping or slidably connected sections 16$^a$ and 16$^b$ which permit it to be adjusted with the roller guard. The roller guard and grass bar are attached to the grass receptacle or pan by offset arms 17 which engage perforations 18 in the bottom of the receptacle, the roller guard being spaced from the roller by the spacing members which rest upon the bottom of the grass receptacle. This arrangement of elements permits the combined roller guard and grass bar to be used with mowers of different widths by simply adjusting them to the width of the mower roller and then attaching them by passing the offset arms 17 through their corresponding perforations provided for the purpose in the bottom of the grass receptacle or pan. The greater amount of the cut grass is thrown by the mower knives to the rear of the grass bar 16 which holds it at the rear of the pan and prevents its forward movement and consequent falling out or discharge at the front of the receptacle as the mower is moved over rough ground or comes into contact with stones or other obstructions, and the roller guard prevents the cut grass which has collected in front of the grass guard from coming in contact with the roller and being carried out of the receptacle.

A chain 19 has attached at one end a bowed spring plate 20 provided with a key-hole aperture 21, and a flexible friction band 22 arranged between the chain and the handle bar to prevent the slipping of the chain from its adjusted position. The chain is fastened to the bar by passing it around the same and through the enlarged portion of the keyhole aperture when the free end of the plate is grasped and pressed against the handle bar as shown in Fig. 7. The link adjacent the restricted portion of the keyhole aperture is then moved into the same which causes the spring plate, which is now under tension, to draw the chain against the friction band and tightly grip the handle bar. The other end of the chain is provided with a hook member 23 and is passed through an eye formed with the hook member 25 which engages an aperture 24 in the end of the grass receptacle. The hook member, 23, is then caught in one of the links of the chain to hold the receptacle at its adjusted position in relation to the height to which the handle bar is to be held while the mower is in use.

It will readily be understood from the foregoing description, taken in connection with the drawings, that the device may be readily assembled and attached to an ordinary lawn mower, or detached and taken apart for shipment or storage and that any of the parts which may become damaged or broken may be easily replaced without impairing the usefulness of the rest of the device.

I have illustrated and described with particularity the preferred details of construction but it is to be understood that changes can be made therein and essential features of the invention retained.

Having thus described my invention, what I claim is:

1. A grass catcher for mowers comprising a receptacle, means for attaching the receptacle to a mower, a bar extending upwardly from the bottom of the receptacle and formed of telescopic sections for adjustment transversely of the receptacle for retaining grass within the receptacle, and means for attachment of the bar to the receptacle.

2. A grass catcher for mowers comprising a receptacle, means for attaching the receptacle to a mower, and a detachable grass guard within the receptacle for retaining mowed grass in the receptacle, said guard extending upwardly from the bottom of the receptacle a sufficient distance to permit grass to pass from front to rear of the guard and retain the grass in the receptacle.

3. A grass catcher for mowers, comprising a receptacle, means for attaching the receptacle to a mower, and a grass guard within the receptacle, adjustable in width.

4. A grass catcher for mowers comprising a receptacle, means for attaching the receptacle to a mower, and a roller guard adjustable in width secured to the receptacle.

5. A grass catcher for mowers comprising a receptacle, means for attaching the receptacle to a mower, and an adjustable roller guard detachably secured to the receptacle.

6. A grass catcher for mowers comprising a receptacle, means for attaching the receptacle to a mower, a grass guard within the receptacle, and a roller guard connected with the grass guard.

7. A grass catcher for mowers comprising a receptacle, means for attaching the receptacle to a mower, a grass guard within the receptacle and a roller guard connected with the grass guard, both the grass guard and roller guard being adjustable in width.

8. A grass catcher for mowers comprising a sectional receptacle formed of bottom and side sections, the meeting edges of the sections at the bottom of the receptacle being formed with flattened interlocking slidable joints for connecting the sections and sustaining the sides in an upright position, and means for attaching the receptacle to a mower.

9. A grass catcher for lawn mowers comprising a sectional receptacle having a bottom section, side sections, an end section, said end section provided with grooves to receive the adjacent ends of the side sections to prevent lateral displacement of the same, means for locking the sections in assembled relation, the receptacle having an open front end, and means at the front end of the receptacle for attaching it to a mower.

10. A grass catcher for lawn mowers comprising a sectional receptacle having a bottom section, side sections, and an end section having forwardly projecting end walls provided with means for engagement with the side sections for locking the sections in assembled relation, the receptacle having an open front end, and means at the front end for its attachment to the mower.

11. A grass catcher for mowers comprising a receptacle and means for attaching the receptacle to a mower including a perforated spring plate, a flexible member secured to said plate and coacting therewith to form a clasp for the handle bar and a hook member secured to said flexible member to adjustably support said receptacle.

12. A grass catcher for mowers comprising a receptacle and means for attaching the receptacle to a mower including a member provided with an arm for engagement with the mower, an offset arm for engagement with the receptacle, and a grip member provided intermediate of the arms to prevent accidental detachment of the member.

In testimony whereof I affix my signature in presence of two witnesses.

AUGUST C. SCHNAKE.

Witnesses:
J. W. KENDALL,
LOUIS PEIFER.

Copies of this patent may be obtained for five cents each, by addressing the "Commissioner of Patents, Washington, D. C."